United States Patent
Zad Tootaghaj et al.

(10) Patent No.: US 11,593,210 B2
(45) Date of Patent: Feb. 28, 2023

(54) LEADER ELECTION IN A DISTRIBUTED SYSTEM BASED ON NODE WEIGHT AND LEADERSHIP PRIORITY BASED ON NETWORK PERFORMANCE

(71) Applicant: Hewlett Packard Enterprise Development LP, Houston, TX (US)

(72) Inventors: Diman Zad Tootaghaj, Milpitas, CA (US); Puneet Sharma, Palo Alto, CA (US); Faraz Ahmed, Milpitas, CA (US); Michael Zayats, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 242 days.

(21) Appl. No.: 17/136,563

(22) Filed: Dec. 29, 2020

(65) Prior Publication Data

US 2022/0206900 A1  Jun. 30, 2022

(51) Int. Cl.
*G06F 11/18* (2006.01)
*G06F 11/14* (2006.01)
(Continued)

(52) U.S. Cl.
CPC ........ *G06F 11/1425* (2013.01); *G06F 9/5072* (2013.01); *G06F 9/5077* (2013.01); *G06F 9/5083* (2013.01); *G06K 9/6223* (2013.01); *G06F 11/187* (2013.01); *G06F 2209/505* (2013.01); *G06F 2209/508* (2013.01)

(58) Field of Classification Search
None
See application file for complete search history.

(56) References Cited

U.S. PATENT DOCUMENTS 6,192,401 B1 * 2/2001 Modiri ............... G06F 11/1425
  370/254
8,582,470 B2  11/2013 Collins et al.
(Continued)

FOREIGN PATENT DOCUMENTS

CN      106790578 A     5/2017

OTHER PUBLICATIONS

Wikipedia, "Container Linux", available online at <https://en.wikipedia.org/w/index.php?title=Container_Linux&oldid=924516638>, Nov. 4, 2019, 9 pages.
(Continued)

*Primary Examiner* — Joseph O Schell
(74) *Attorney, Agent, or Firm* — Hewlett Packard Enterprise Patent Department

(57) ABSTRACT

Example implementations relate to consensus protocols in a stretched network. According to an example, a distributed system includes continuously monitoring network performance and/or network latency among a cluster of a plurality of nodes in a distributed computer system. Leadership priority for each node is set based at least in part on the monitored network performance or network latency. Each node has a vote weight based at least in part on the leadership priority of the node. Each node's vote is biased by the node's vote weight. The node having a number of biased votes higher than a maximum possible number of votes biased by respective vote weights received by any other node in the cluster is selected as a leader node.

20 Claims, 5 Drawing Sheets

(51) Int. Cl.
*G06F 9/50* (2006.01)
*G06K 9/62* (2022.01)

(56) References Cited

U.S. PATENT DOCUMENTS

| | | | |
|---|---|---|---|
| 10,346,430 B2* | 7/2019 | Horowitz | G06F 11/0793 |
| 10,791,107 B2 | 9/2020 | Lin | |
| 2005/0132154 A1* | 6/2005 | Rao | G06F 11/1425 |
| | | | 709/201 |
| 2009/0190496 A1* | 7/2009 | Mohamed-Rasheed | |
| | | | H04L 41/30 |
| | | | 370/254 |
| 2018/0063238 A1* | 3/2018 | Zhang | G06F 11/1425 |
| 2019/0288993 A1* | 9/2019 | Lin | G06F 11/1441 |
| 2020/0257593 A1* | 8/2020 | Zhou | H04L 45/02 |
| 2021/0037091 A1* | 2/2021 | Prabhu | G06F 11/3006 |

OTHER PUBLICATIONS

Github, "Test", available online at <https://github.com/etcd-io/etcd/blob/master/test>, reterived on Jan. 21, 2021, 1 page.
Github, "Understanding performance", available online at <https://github.com/etcd-io/etcd/blob/master/Documentation/op-guide/performance.md>, reterived on Jan. 21, 2021, 4 pages.
Leslie Lamport, "Paxos Made Simple" ACM SIGACT News, Nov. 1, 2001, 14 pages.
Leslie Lamport, "The Part-time Parliament", Association for Computing Machinery (ACM) Transactions on Computer Systems, vol. 16, No. 2, May 1998, pp. 133-169.
Ongaro et al., "In Search of an Understandable Consensus Algorithm", Proceedings of USENIX ATC '14, 2014 USENIX Annual Technical Conference, Jun. 19, 2014, 16 pages.
Polencic, D., How do you connect Kubernetes clusters located in different data centres?, Apr. 2019, 13 pages.

* cited by examiner

LEADER ELECTION IN A DISTRIBUTED SYSTEM BASED ON NODE WEIGHT AND LEADERSHIP PRIORITY BASED ON NETWORK PERFORMANCE

BACKGROUND

Fault-tolerance is a fundamental foundation of large-scale distributed systems. Almost all distributed systems rely on a consensus protocol that ensures all the replicas reach a consensus, that is, agree on the order for a given client request, even if some of the replicas are faulty.

One of the oldest and most popular computing industry solutions to implement consensus in distributed systems is called Paxos. However, Paxos has a reputation for being difficult to understand and implement correctly. This is due to the fact that its original description leaves out implementation details to make it easier to understand and prove correctness. A more recent protocol called Raft has been designed with the aim of simplifying the understanding and the implementation of Paxos. Raft is a consensus protocol that allows distributed nodes to maintain one common replicated state. Raft decomposes consensus into three sub-problems: (1) leader election, (2) log replication, and (3) safety.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
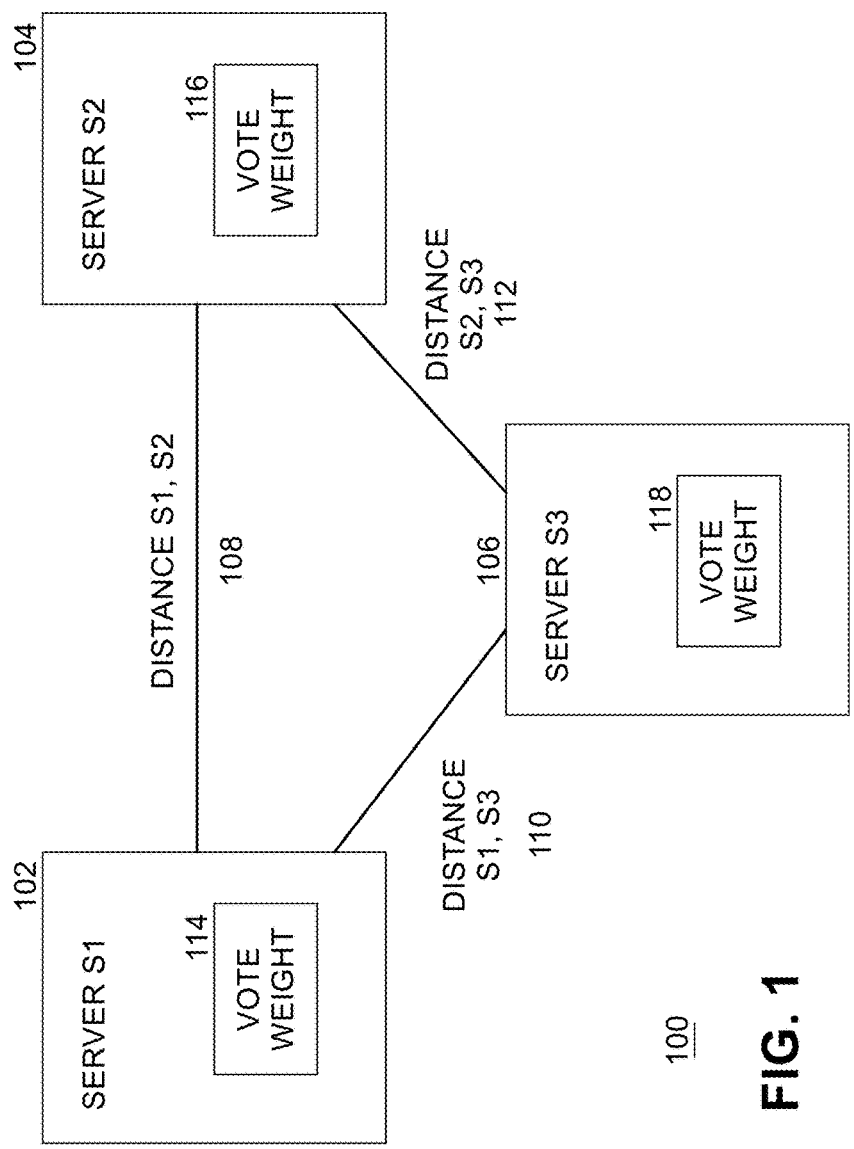
FIG. 1 is diagram of an example stretched network according to some embodiments.

Embodiments described herein are generally directed to systems and methods for an adaptive consensus protocol for leader election in distributed systems. In some embodiments, the distributed system is a stretched network with heterogeneous inter-node latencies. In a distributed cluster of server nodes where the nodes are not in close proximity to each other (e.g., a stretched network), the location of the elected leader node can significantly impact the read/write performance of the consensus protocol. Embodiments describe a consensus protocol to enhance the read/write performance of the consensus protocol by adding leadership priorities to the leader election process. In an embodiment, a leadership priority is represented as a vote weight. For example, if a node, with a vote weight of 5, gets votes from 2 other nodes during the leader election phase, its total vote value will be 2*5=10.

In the following description, numerous specific details are set forth in order to provide a thorough understanding of example embodiments. It will be apparent, however, to one skilled in the art that embodiments described herein may be practiced without some of these specific details. In other instances, well-known structures and devices are shown in block diagram form.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

A "distributed system" generally refers to a collection of autonomous computing elements (also referred to herein as "nodes") that appears to its users (e.g., people or applications) as a single coherent system. The nodes of a distributed system may include components executed on or represented by different computer elements or computer systems that are coupled in communication and which communicate and coordinate their actions. The nodes of a distributed system interact with one another in order to achieve a common goal, for example, support and/or provision of a particular service. The nodes of a distributed systems may be coupled in communication via a communication link (e.g., a bus, a switch fabric, a wireless or wired network, or a combination thereof) and are typically spread over multiple failure domains to enhance service availability. For example, geographically distributed nodes may be coupled in communication via one or more private and/or public networks (e.g., the Internet). There are various types of distributed systems, including distributed computing systems, distributed information systems and distributed pervasive (or ubiquitous) systems. Examples of distributed computing systems, which are typically used for high performance computing tasks, include cluster and cloud computing systems and grid computing systems. Examples of distributed information systems, which are typically used for management and integration of business functions, include transaction processing systems and Enterprise Application Integration. Examples of distributed pervasive (or ubiquitous) systems, which typically include mobile and embedded systems, include home systems and sensor networks.

A "service" generally refers to a process or function performed by or otherwise supported in whole or in part by a distributed system. For example, the nodes of the distributed system may make some contribution to a service provided by its user(s) (e.g., upstream systems or applications) in the form of providing, server services, storage services, storage networking services, computing resources, storage resources and/or networking resources on behalf of the user(s). Alternatively, the nodes of the distributed system may be responsible for and effectively represent the entirety of the service. Non-limiting examples of a service include a webservice, cloud management, cloud infrastructure services, a distributed application, a managed service, and transaction processing. Embodiments described herein may be particularly well-suited to services requiring strong consistency.

A "node" generally refers to an autonomous computing element. The nodes of a distributed system may be computer systems (e.g., clients, servers or peers) in virtual or physical form, one or more components of a computer system, computing elements, hardware devices, software entities or processes, or a combination thereof. Non-limiting examples of nodes include a software process (e.g., a client or a server), a virtual machine, a virtual controller of a storage software stack, a storage server, a hyperconverged platform, a data virtualization platform, a sensor, and an actuator.

A "cluster" is a subclass of a distributed system and generally refers to a collection of multiple nodes that work together. Some reasons for clustering nodes include high availability, load balancing, parallel processing, systems management and scalability. "High-availability clusters" (also referred to as failover clusters or HA clusters) improve the availability of the cluster approach. HA clusters have redundant nodes which are then used to maintain the availability of service despite the occurrence of various failure scenarios (e.g., a node failure and/or a network partition) for which the cluster may be designed to tolerate.

A "quorum" generally refers to the minimum number of nodes that have to agree on a particular type of operation in the context of a distributed system. According to one embodiment, a quorum is a strict majority of the voting nodes. Examples of operations that require quorum include, but are not limited to, continuing service after a network partition, reconstitution of the cluster, continuing service after one or more voting nodes have failed, and dynamically updating the number of voters during runtime.

A "quorum evaluation process" generally refers to a consensus algorithm. Non-limiting examples of quorum evaluation processes include the Paxos algorithm and the Raft algorithm.

An "arbiter" generally refers to a process or node that acts as a witness to ensure data availability and data consistency for a distributed system should a node of the distributed system experience downtime or become inaccessible. According to one embodiment, the arbiter provides a vote and is implemented in the form of a server for tie-breaking and located in a failure domain separate from the nodes of the distributed system that respond to requests relating to the service supported by the distributed system. In this manner, should multiple groups of nodes become partitioned from each other, the arbiter allows one group to achieve quorum and form a reconstituted cluster, while the other group is denied quorum and cannot form a reconstituted cluster.

A "voter" or a "voting node" generally refers to a node of a distributed system that participates in the quorum evaluation process employed by the distributed system for a particular service supported or provided by the distributed system. When only one service is supported or provided by the distributed system, the limitation above relating to "for a particular service" is of no consequence; however, when the distributed system supports or provides multiple services, embodiments described herein allow for the node's role as a voter or non-voter to be defined on a service-by-service basis. As such, a node may be a voter for a first service supported or provided by the distributed system and may be a non-voter for a second service. Alternatively, the node may be a voter for both the first and second services. Finally, the node may be a non-voter for both the first and second services.

A "non-voter" or a "non-voting node" generally refers to a node of a distributed system that does not participate in the quorum evaluation process employed by the distributed system for a particular service. Since non-voting nodes do not participate in the quorum evaluation process, the amount of communications required for the quorum evaluation process is limited, thereby providing better scalability.

Distributed systems have the following characteristics: 1) Concurrency: The processes in the distributed system operate concurrently, that is, each machine in the network executes events independently at the same time as other machines in the network. 2) Lack of a global clock: A way to determine the order of the events is needed in a distributed system. However, there is no single global clock that determines the sequence of events happening across all machines in the network. 3) Independent failure of components: A critical aspect of distributed systems is to understand that it is impossible to have a system free of faults. Therefore, one of the key design aspects of a distributed systems is to tolerate the failures. 4) Message passing: The network machines in the distributed system communicate and coordinate by message passing. Messages can be passed using any message passing protocol such as hyper-text transport protocol (HTTP), remote procedure call (RPC), etc. The message passing environment can be synchronous or asynchronous. Synchronous message passing occurs between objects that are running at the same time, and in an asynchronous message passing system, the receiving object can be down or busy when the requesting object sends the message.

Consensus protocols are used in distributed systems. One goal is to achieve reliability in the presence of faulty processes. This requires agreement for a single data value among a number of processes. Some of the processes may be unreliable or faulty and the consensus protocol should tolerate failures. Examples of consensus applications include whether to commit a transaction on a database, state machine replication, lock management, clock synchronization, agreeing on the identity of the elected leader, etc.

Consensus requires the following conditions to be met: (i) agreement, that is, all nodes which are running correctly should arrive at the same value, (ii) validity, that is, the value chosen is the one that was proposed by the node which was running correctly, and (iii) termination, that is, all nodes which are running correctly should eventually decide on a value.

One approach to reach consensus is for all processes to agree on a majority value. In this approach, each process is given a vote and the majority requires to have at least one more than half of the votes. The number of nodes required to participate in the agreement is known as quorum size. Consensus protocols usually tolerate a limited number of failures.

The Raft protocol is a consensus protocol that allows distributed nodes to maintain one common replicated state. Raft decomposes consensus into three sub-problems: (1) leader election, (2) log replication, and (3) safety. Each server in Raft exists in one of the three states: leader, follower, or candidate state. The servers in the follower state are passive and expect to get regular heartbeats from the leader. If the servers don't get the heartbeat, the servers go into the candidate state and start an election. If a server wins the election, the server becomes the leader.

The Raft protocol consists of two remote procedure calls (RPCs). An RPC is a protocol that one program can use to request a service from a program located in another computer on the network without having to understand the network's details. The two RPCs in Raft are: 1) request to vote, which is asked by the candidates and 2) append entries, which is asked by the leader to replicate the logs. The Raft protocol does not rely on a global clock for synchronization and global partial ordering of events is achieved with a monotonically increasing value, known as term. Each term starts with an election and if the election does not fail (due to vote split), the leader continues to operate until the leader crashes. A server's term is updated when the server restarts an election or when the server learns from another node that its term is out of date. If a server sees that its term is lower than another one, the server will update its term and immediately becomes a follower. In order to get elected, the server who became the candidate increases its term number and votes for itself, then the server sends a request to vote RPC to all other servers. Other servers upon receiving the request to vote should immediately give their vote to the server who asks for the vote if they haven't already voted on the current term.

In order to avoid split votes and avoid deadlock (keep voting forever without electing a leader) Raft relies on a random timer, called election time out, which specifies how much each server has to wait before starting a new election. The election timeout is chosen as a random number in the interval [T, 2T], where T is recommended to be 10 times the maximum of average round-trip time (RTT) between members. By using a random timer, one server will time out first and will start the election. The heartbeat interval and election time out values are set equal for all members of the cluster.

Kubernetes is an open-source container-orchestration system for automating application deployment, scaling, and management (maintained by the Cloud Native Computing Foundation and available on the Internet at kubernetes.io). Kubernetes helps provide simple and easy management of a cluster, which consist of a group of host nodes running Linux® containers. Kubernetes clusters can span host computers (e.g., servers/nodes) across on premise, public, private, or hybrid clouds. Therefore, it is a good computing platform for hosting cloud native applications that require fast scaling. The Kubernetes master controls Kubernetes nodes and directs the communication across the system. The Kubernetes application programming interface (API) server allows clients to configure the workloads and containers across worker nodes.

Kubernetes includes a distributed key value store called ETCD, which is an open-source implementation of the Raft protocol used for storing and replicating the state of the cluster. ETCD is managed by the Cloud Native Computing Foundation and available on the Internet at etcd.io. In addition to Kubernetes, ETCD serves as the backbone of many distributed systems and provides a reliable way for storing data across a cluster of servers.

Embodiments of the present disclosure comprise a process to enable a consensus protocol (e.g., the ETCD implementation of the Raft protocol) to add leadership priorities to leader election.

Existing systems where nodes are not in close proximity to each other can give rise to inefficiencies in read/write performance during leader elections in a consensus protocol. Embodiments of the latency-aware adaptive consensus protocol described herein improve such read/write performance during leader elections by: 1) Adding priorities to the leader election process by adding leadership priority values called vote weights, which can be configured based on system architecture requirements. 2) Properly choosing the leadership priorities. 3) Setting priorities based on geographic location of nodes. 4) Clustering of nodes to enable quorum selection. 5) Using heartbeat signals and election timeouts to detect when a leader fails and call a new leader election.

FIG. 1 is diagram of an example stretched network 100 according to some embodiments. In one embodiment, a distributed system may be in the form of a stretched network 100 (also called a stretched cluster system), e.g., a deployment model in which two or more physical or virtual servers are part of the same logical cluster, but are located in separate geographical locations to be able to survive localized disaster events. In other embodiments, network 100 need not be a stretched network. In this simple example, there are three servers (e.g., nodes) represented, although in other examples any number of servers may be included in network 100.

The Raft consensus protocol includes two commands: etcd and etcdctl. Flags for the etcd command include the member flags: --name, --data-dir, --listen-client-urls, --listen-peer-urls, --election-timeout (default 1000), --heartbeat-interval (default 100), and so on. Flags for the etcd command include the cluster flags: : --initial-advertise-peer-urls, --advertise-client-urls, -initial-cluster-token (to protect from unintended cross-cluster interaction when running multiple clusters), and --initial-cluster (initial cluster configuration for bootstrapping). Flags for the etcdctl command include member list/add/remove.

For example, to set up a three node cluster (e.g., including servers S1 102, S2 104, and S3 106) in stretched network 100, the following commands may be run by a system administrator manually entering the commands into a command line interface or by automatically executing a script (e.g., that accesses a configuration file) containing the commands.

etcd1: bin/etcd --name S1 --listen-client-urls http://127.0.0.1:2379 --advertise-client-urls http://127.0.0.1:2379 --listen-peer-urls http://127.0.0.1:12380 --initial-advertise-peer-urls http://127.0.0.1:12380 --initial-cluster-token etcd-cluster-1 --initial-cluster 'S1=http://127.0.0.1:12380,S2=http://127.0.0.1:22380,S3=http://127.0.0.1:32380' --initial-cluster-state new etcd2: bin/etcd --name S2 --listen-client-urls http://127.0.0.1:22379 --advertise-client-urls http://127.0.0.1:22379 --listen-peer-urls http://127.0.0.1:22380 --initial-advertise-peer-urls http://127.0.0.1:22380 --initial-cluster-token etcd-cluster-1 --initial-cluster 'S1=http://127.0.0.1:12380,S2=http://127.0.0.1:22380,S3=http://127.0.0.1:32380' --initial-cluster-state new etcd3: bin/etcd --name S3 --listen-client-urls http://127.0.0.1:32379 --advertise-client-urls http://127.0.0.1:32379 --listen-peer-urls http://127.0.0.1:32380 --initial-advertise-peer-urls http://127.0.0.1:32380 --initial-cluster-token etcd-cluster-1 --initial-cluster 'S1=http://127.0.0.1:12380,S2=http://127.0.0.1:22380,S3=http://127.0.0.1:32380' --initial-cluster-state new Servers S1 102, S2 104, and S3 106 can now communicate with each other in stretched network 100. In this example, the distance (and resulting network latency) between S1 102 and S2 104 is distance S1, S2 108, the distance between S1 102 and S3 106 is distance S1, S3 110, and the distance between S2 104 and S3 106 is distance S2, S3 110. However, existing implementations of the Raft protocol may incur inefficiencies when the locations of the servers are not evenly distributed in the network, for example, when distance S1, S3 110 and distance S2, S3 112 is greater than (e.g., >>) distance S1, S2 108. For example, S1 102 and S2 104 may be in one location, and S3 106 may be in a different location.

In embodiments of the present disclosure, a leadership priority, also called a vote weight, is added to the definition of each server node in the stretched network 100. The vote weight specifies the priority of a node's vote in a leader election. In an embodiment, the vote weights bias the election decision because the vote value (e.g., 0 or 1) of a node is multiplied by the vote weight for the node. In one embodiment, the vote weight is either a 0 or a 1. The vote weight of a node is chosen to be 0 to avoid the node from becoming the leader. This can improve the performance specially in cases where one of a few nodes have higher delays to other nodes in the cluster. In other embodiments, the vote weight can be any natural number (e.g., with the higher vote weights being more important for leader election than lower vote weights in one embodiment). The higher vote weight can be the result of a node being closer to the majority of nodes or having higher resources such as higher memory or computational capacity etc.). In one example, the vote weight 114 of Server S1 102 could be set to 1, the vote weight 116 of Server S2 104 could be set to 1, and the vote weight 118 of Server S3 106 could be set to 0. Since the vote weight of S3 is 0, the resulting vote of S3 will not be taken into account during a leader election process, regardless of whether the vote of S3 is a 0 or a 1. Thus, S3 will not become the leader (which is desirable since in this example S3 is not co-located with S1 and S2, so having S3 become the leader would incur delays in the read/write processing). In an embodiment, vote weights for nodes may be initialized when the cluster is set up as shown in the example below. In other examples, other vote weights (whether binary or natural numbers) may be used.

In an embodiment, a vote weight for a node may be changed during run-time based at least in part on monitored network performance and/or network latencies by changing a configuration file setting for the node.

For example, to set up a three node cluster (e.g., including servers S1 102, S2 104, and S3 106) where nodes have associated vote weights in stretched network 100, the following commands may be run by a system administrator manually entering the commands into a command line interface or by automatically executing a script (e.g., that accesses a configuration file) containing the commands.

etcd1: bin/etcd --name S1 --listen-client-urls http://127.0.0.1:2379 --advertise-client-urls http://127.0.0.1:2379 --listen-peer-urls http://127.0.0.1:12380 --initial-advertise-peer-urls http://127.0.0.1:12380 --initial-cluster-token etcd-cluster-1 --initial-cluster 'S1=http://127.0.0.1:12380,S2=http://127.0.0.1:22380,S3=http://127.0.0.1:32380' --initial-cluster-state new-VoteWeight 1 etcd2: bin/etcd --name S2 --listen-client-urls http://127.0.0.1:22379 --advertise-client-urls http://127.0.0.1:22379 --listen-peer-urls http://127.0.0.1:22380 --initial-advertise-peer-urls http://127.0.0.1:22380 --initial-cluster-token etcd-cluster-1 --initial-cluster 'S1=http://127.0.0.1:12380,S2=http://127.0.0.1:22380,S3=http://127.0.0.1:32380' --initial-cluster-state new-VoteWeight 1 etcd3: bin/etcd --name S3 --listen-client-urls http://127.0.0.1:32379 --advertise-client-urls http://127.0.0.1:32379 --listen-peer-urls http://127.0.0.1:32380 --initial-advertise-peer-urls http://127.0.0.1:32380 --initial-cluster-token etcd-cluster-1 --initial-cluster 'S1=http://127.0.0.1:12380,S2=http://127.0.0.1:22380,S3=http://127.0.0.1:32380' --initial-cluster-state new-VoteWeight 0

In embodiments, the decision on how to choose the leader is based on the votes as biased by the leadership priorities (e.g., vote weights 114, 116, and 118) which are configured when creating a cluster. The leadership priorities can also be adjusted later using changes to configuration files for the cluster. In some cases, one or more clusters may be rearranged based at least in part on changes in leadership priorities. For example, the cluster may be rearranged by electing a new leader node. Each node upon arrival in stretched network 100 broadcasts its identifier (ID) and its leadership priority (e.g., vote weight) to all other nodes in the stretched network. During the leader election process, each node compares its total number of received votes as biased by the vote weight of this node with the number of votes received by other nodes as biased by the maximum vote weight of the other nodes as follows.

Suppose each node i has a vote weight of $VoteWeight_i$ and receives $x_i$ votes from other nodes. Let n be the total number of votes in the system and N be the set of nodes in the system. Then if the following inequality holds then node i can claim leadership:

$$VoteWeight_i * (x_i) > (n - x_i) * Max_{j \in N, j \neq i}(VoteWeight_j)$$

That is, a node can claim leadership if its total number of votes received biased by its vote weight is larger than the maximum possible biased votes received by any other node in the cluster.

The same expression can be re-written as follows to simplify the decision making based on a constant number $1 + \frac{n}{2}$:

$$\frac{(x_i) * (VoteWeight_i + Max_{j \in N, j \neq i}(VoteWeight_j))}{2 * Max_{j \in N, j \neq i}(VoteWeight_j)} + 1 > 1 + n/2$$

It is noted that by using this approach safety is provided, meaning that the system avoids electing two nodes as a leader. However, it is possible that the term ends up with no elected leader and in this case the election restarts.

Thus, in embodiments, the concept of quorum is changed to include vote weights that bias votes on an individual node basis, and each node keeps track of all vote weights of nodes and compares them along with the votes during leader election process.

In one embodiment, the vote weight for a node may be set to 1 for a node that is in one location (e.g., on-site or local) and set to 0 for a node that is in another location (e.g., off-site or non-local). In this example, this forces the leader to be on-site and gives zero priority for leadership election purposes to nodes that are not on-site. In other embodiments, vote weighs may be set on a scale of priorities. For example, vote weights may be in a range from 0 to 3 as natural numbers, 0 to 5, 0 to 10, and so on. In other embodiments, vote weights can be set as a normalized number between 0 and 1. The decision to choose the vote weight for each node can be based on the geographical location of the nodes, the network latency of the nodes from each other or other measures of network performance or the amount of computing resources each node has. For example, the amount of processing power or memory size, etc.

In an embodiment, each node continuously monitors network performance and/or network latency by sending end-to-end probes to all other nodes in the cluster. Examples of network performance being monitored includes round trip time, one way delay, network bandwidth, jitter, etc. The collected measurements are then used to adaptively and periodically set or reset the leadership priorities for the nodes.

In the default implementation of ETCD, once a new command by a client is submitted to one of the nodes in the computing system and before the command is executed the command has to be replicated to logs in all nodes (e.g., each node adds this command to the node's log). The command is considered committed when the log is durably stored on a quorum of nodes. Once the command is committed, the original state machine for the nodes returns a value back to the client.

In the default setting, the leader has to wait for the majority of the nodes to return the command. However, in a stretched network with variable delays between different nodes, the read/write performance may be negatively impacted by the longest delay from a node to the leader. Therefore, the nodes which have the longest delay in the quorum will dominate the read/write delay. To solve this problem, in embodiments, write weights are assigned to the nodes. This weighted approach can also be used to prioritize nodes with larger storage capacities. For example, some of the nodes in the cluster might have a higher storage/computational capacity than other nodes and therefore can store/process more data. In one embodiment, these higher capacity nodes are given higher write weight during read/write processing.

The decision on when to confirm the read/write commit is based on the quorum weight (write weight) which is configured when creating a cluster. The write weights can also be re-configured later during runtime using configuration files. Each node upon arrival broadcasts the node's ID and write weight to all other nodes in the computing system. Each node keeps track of the write weights of all nodes. During a read/write operation, the leader waits for the weighted quorum of nodes to confirm before committing the write or returning the value to the client as follows:

$$quorum = \frac{Sum_{i \in N}(WriteWeight_i)}{2} + 1$$

Write weights may be added as an additional parameter when starting the example cluster (e.g., including servers S1 102, S2 104, and S3 106) in the stretched network 100, as shown in an example below.

etcd1: bin/etcd --name S1 --listen-client-urls http://127.0.0.1:2379 --advertise-client-urls http://127.0.0.1:2379 --listen-peer-urls http://127.0.0.1:12380 --initial-advertise-peer-urls http://127.0.0.1:12380 --initial-cluster-token etcd-cluster-1 --initial-cluster 'S1=http://127.0.0.1:12380, S2=http://127.0.0.1:22380,S3=http://127.0.0.1:32380' --initial-cluster-state new-VoteWeight 1 -WriteWeight 1 etcd2: bin/etcd --name S2 --listen-client-urls http://127.0.0.1:22379 --advertise-client-urls http://127.0.0.1:22379 --listen-peer-urls http://127.0.0.1:22380 --initial-advertise-peer-urls http://127.0.0.1:22380 --initial-cluster-token etcd-cluster-1 --initial-cluster 'S1=http://127.0.0.1:12380,S2=http://127.0.0.1:22380,S3=http://127.0.0.1:32380' --initial-cluster-state new-VoteWeight 1 -WriteWeight 2 etcd3: bin/etcd --name S3 --listen-client-urls http://127.0.0.1:32379 --advertise-client-urls http://127.0.0.1:32379 --listen-peer-urls http://127.0.0.1:32380 --initial-advertise-peer-urls http://127.0.0.1:32380 --initial-cluster-token etcd-cluster-1 --initial-cluster 'S1=http://127.0.0.1:12380,S2=http://127.0.0.1:22380,S3=http://127.0.0.1:32380' --initial-cluster-state new-VoteWeight 0 WriteWeight 0

Further, the write weight can be set during run time by changing the cluster's configuration files.

Experimental evaluation of the proposed approach has shown that this may improve the read/write performance in cases where the quorum of the nodes has a high variance of network latency from the leader.

According to one embodiment, a leader node of the distributed system sends a heartbeat to all other nodes. The heartbeat may be a periodic signal generated by hardware or software to indicate ongoing normal operation. For example, the heartbeat may be sent at a regular interval on the order of seconds. In one embodiment, if a node does not receive a heartbeat from the leader node for a predetermined or configurable amount of time (which we call election time out)—usually 10 or more heartbeat intervals—the node that should have sent the heartbeat (e.g., the leader node) is assumed to have failed. When the leader node fails, an election is called.

In an embodiment, leadership priorities are set based on end-to-end network latency. The nodes are divided into two clusters using the end-to-end latency as measured by performance monitor. To do so, the largest round trip time (RTT) of messages between nodes is selected and the node with the largest RTT is selected as a cluster head node. The delay of each node from the cluster head node is compared and if a node has a delay smaller than the cluster head node the node is put into a first cluster, otherwise the node is put into a second cluster. Using this approach, a majority cluster can be created having a greater number of nodes (having smaller delays than the cluster head node) and a minority cluster (having greater or equal delays than the cluster head node) can be created having a lesser number of nodes. If both the majority and minority clusters have the same number of nodes, the node with the largest latency is moved from one cluster and into the other cluster. In an embodiment, the leadership priority (e.g., vote weight) is set to one for nodes in the majority cluster and to zero for nodes in the minority cluster.

In one embodiment, the heartbeat intervals and election timeouts may be set as follows.

$$HeartBeat_i = \begin{cases} \text{Max } (RTT_{cluster\{i\}}) & \text{if } i \text{ in Majority Cluster} \\ RTT_{cluster\{i,j\}} & \text{if } i \text{ in Minority Cluster} \end{cases}$$

$$ElectionTimeOut_i = \begin{cases} 10 * \text{Max } (RTT_{cluster\{i\}}) & \text{if } i \text{ in Majority Cluster} \\ 10 * RTT_{cluster\{i,j\}} & \text{if } i \text{ in Minority Cluster} \end{cases}$$

In the general case, it is assumed that all nodes belong to a single cluster. First, the latencies are obtained from performance monitor 202 and sorted for each cluster node. The network latencies are then sorted and the heartbeat interval and election timeout are set based on the largest delay for each node from the quorum as follows:

```
For ETCD server i=1 to N do:
  For ETCD server j=1 to N do:
    Find RTT_{ij} and append it to RTT_{i}
  Sort RTT_{i}
  Let RTT_{quorum} = RTT_{i}[N/2] // Where [N/2] returns the ceiling function
when N is odd
  Heartbeat_i = RTT_{quorum}
  ElectionTimeOut_i = 10* Heartbeat_i
```

In another embodiment, leadership priorities are set based on the geographical location of the nodes. In addition to using the network monitoring information as discussed above, the geographical location of the nodes (e.g., latitude and longitude) may be obtained and leadership priority controller 306 performs a K means clustering process to categorize the nodes into a majority cluster and a minority cluster based on location. Leadership priority controller 306 then sets the vote weight to one for nodes in the majority cluster and to zero for nodes in the minority cluster to force the leadership to be on-site.

In another embodiment, leadership priorities are set based on some network performance measures. For example, the cluster manager can set the vote weight of node i to be a normalized number based on the round trip time of node i to other nodes in the cluster and the round trip times of all other nodes to each other as follows:

$$VoteWeight_i = \frac{\sum_{j \in N} 1/RTT_{i,j}}{\sum_{m \in N}\sum_{j \in N} 1/RTT_{m,j}}$$

Figure 2:
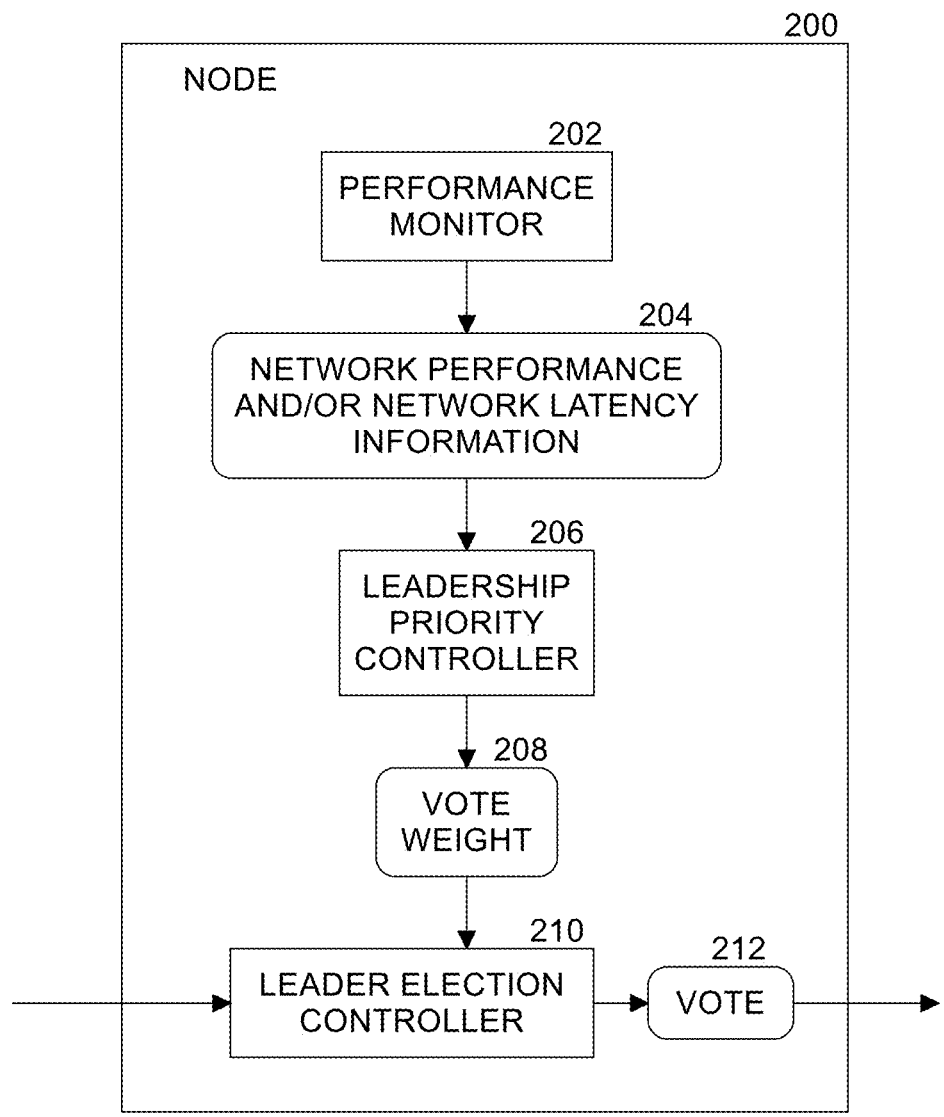
FIG. 2 is a diagram of adaptive consensus protocol leader election processing according to some embodiments.

FIG. 2 is a diagram of adaptive consensus protocol processing according to some embodiments. Node 200 is a representative sample of any one or more of S1 102, S2 104, and S3 106 of FIG. 1. Node 200 includes performance monitor 202 to monitor the performance of node 200 and stretched network 100. Performance monitor 202 may perform the latency measurements described above. Node 200 may be implemented in a combination of a processor and a computer-readable medium, an application specific integrated circuit (ASIC), a field programmable gate array (FPGA), or any other circuitry. Performance information 204 may include network performance information, and/or network latency information such as round-trip times (RTTs) or one-way delay for sending messages between nodes. Network performance and/or network latency information 204 may be collected at predetermined intervals (e.g., every minute, every five minutes, every half hour, every hour, etc.) or on demand. Leadership priority controller 206 analyzes network performance and/or network latency information 206 to set a vote weight 208 for node 200. For example, leadership priority controller 206 sets the node's vote weight to either a 0 or a 1. In another example, vote weights may be in a range of values, such as from 0 to 4, 0 to 10, and so on. In another example, vote weights can be set as a normalized number between 0 and 1. In one embodiment, instead of using network performance and/or network latency information, leadership priority controller 206 may use other information, such as geographic location of the node or cluster identification. Cluster identification may be used to give a higher priority to nodes in one cluster and a lower priority to nodes in other cluster(s). When a leader needs to be elected, leader election controller 210 biases the node's vote with vote weight 208 before sending the node's vote 212 to other nodes. In an embodiment, the vote 212 is multiplied by the vote weight 208.

Figure 3:
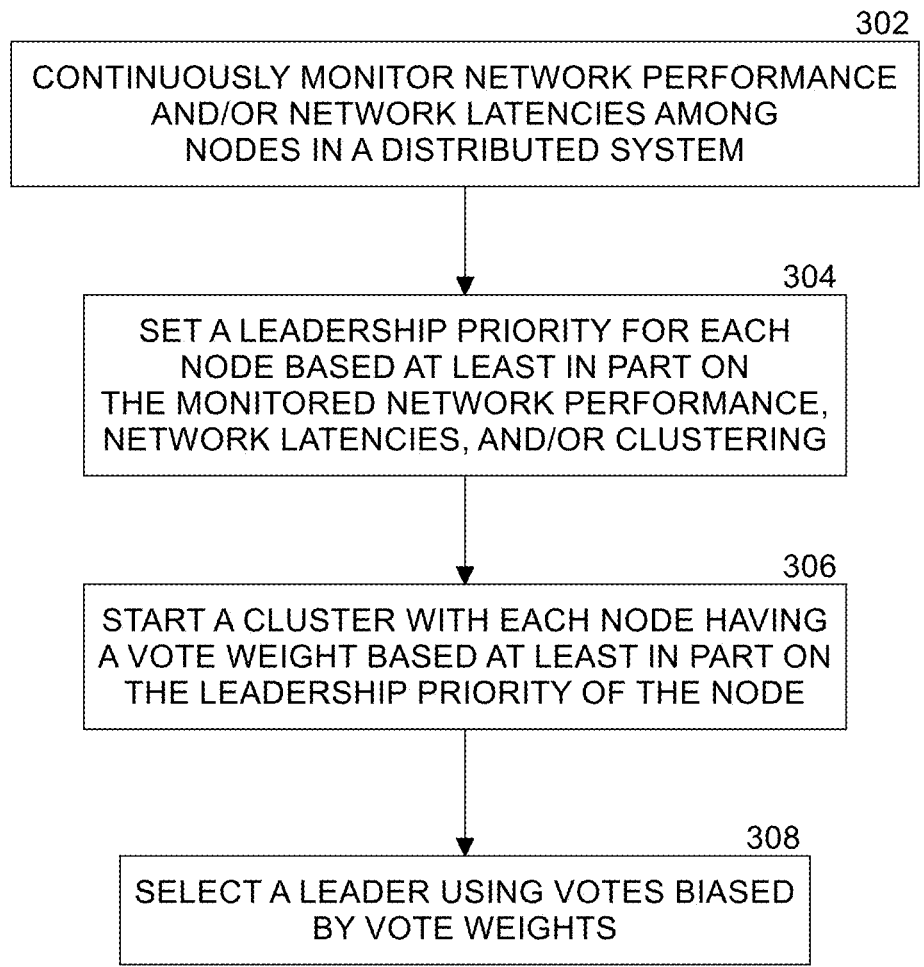
FIG. 3 is a flow diagram of adaptive consensus protocol leader election processing according to some embodiments.

FIG. 3 is a flow diagram of adaptive consensus protocol leader election processing 300 according to some embodiments. The processing described with reference to FIG. 3 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more nodes of various forms, such as each of the nodes described with reference to FIGS. 1, 2, 4, and 5. For sake of brevity, this flow diagram and the below description focus on processing related to various aspects of the adaptive consensus protocol leader election functionality. Those skilled in the art will appreciate various other processing (e.g., the operations and processes performed in connection with providing or otherwise supporting a particular service by the distributed service or a particular service provided by a user of the distributed system).

Embodiments described herein include various steps, examples of which have been described above. As described further below, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Embodiments described herein may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various embodiments described herein may involve one or more computing elements or computers (or one or more processors within a single computer) and storage systems containing or having network access to computer program(s) coded in accordance with various methods described herein, and the method steps of various embodiments described herein may be accomplished by modules, routines, subroutines, or subparts of a computer program product.

At block 302, performance monitor 202 of a node continuously monitors network performance and/or network latency among a plurality of nodes coupled in communication via a network in a distributed computer system. How often the monitoring is performed is implementation dependent. At block 304, leadership priority controller 206 of the node sets a leadership priority for the node based at least in part on the monitored network performance and/or network latency. In one embodiment, leadership priority controller 206 sets the leadership priority based at least in part on the RTTs of the nodes as described above. In one embodiment, leadership priority controller 206 sets the leadership priority based at least in part on the clustering of nodes of the network as described above. In one embodiment, leadership priority controller 206 sets the leadership priority based at least in part on the geographic location of the nodes as described above.

At block 306, a system administrator or system software executing a script accessing a configuration file containing etcd commands starts a cluster with each node having a vote weight based at least in part on the leadership priority of the node, each node's vote being biased by the node's vote weight. At block 308 leader election controller 210 selects a leader using votes biased by vote weights as described above. In an embodiment, selection of the leader is performed according to the Raft protocol. In an embodiment, leader election controller 210 selects one of the plurality of nodes to become a leader node during an election, the selected leader node having a higher number of votes as biased by the respective vote weights than the maximum possible number of votes as biased by the maximum vote weight in the cluster.

During runtime, when an update is required, in one embodiment one or more clusters may be reconfigured based at least in part on the changing leadership priorities of the nodes. In this scenario, continuous monitoring of network performance and/or network latencies may indicate that a change to leadership is needed (for example, when network latencies change more than a predetermined threshold amount or the network is experiencing congestion). Accordingly, leadership priority controllers 206 in nodes set new leadership priorities at block 304. Once the cluster is set up and a leader is elected, the leader election is the result of a previous leader failure or a network failure when other nodes do not receive the heartbeat messages from the leader for a predetermined period of time. In other embodiment, the method of FIG. 3 may also include other actions. For example, method 300 may include setting a write weight for a node for use in quorum selection during leader elections. For example, method 300 may include setting heartbeat intervals and election timeouts to be used to detect leader failures.

Embodiments of the present invention implement a modified consensus protocol based on open-source ETCD implementation of the Raft protocol. Embodiments continuously monitor the network performance and/or network latencies among different server nodes in a cluster. Embodiments use the monitoring information to set a leadership priority for each node. Embodiments add a vote weight to start a new cluster with different voting priorities specified in the vote weight. The vote weights can be re-configured by manually editing the configuration files or by automatically updating the vote weights by leadership priority controller 206 based on monitored network performance and/or latency information 204. Some embodiments use a clustering approach to force the leader to be on-site by giving zero priority to the nodes which are not on-site.

Embodiments provide better performance than using the default implementation ETCD key-value store, especially for a stretched network with variable latencies among the server nodes. The administrative user can control and specify the votes based on different parameters. For example, a vote weight of zero can be assigned to a node which is not on-site to avoid having a leader which is not on-site. Further, by forcing the leader to be on-site unnecessary high-latency communication between different nodes within the cluster is avoided during read/write operations to reach consensus.

Embodiments provide at least several performance improvements. (1) Assigning vote weights to nodes for leader election. This helps performance because if the leader is far from the other nodes in the quorum, then every time a read or write happens the nodes wait for the quorum to apply the changes and wait for the acknowledgement from all nodes in the quorum to tell the client node that the read/write has been committed. Therefore, by choosing the leader in closer proximity to other nodes, such performance degradation may be lessened. (2) Adding write weight or biasing the quorum. This can also improve the read/write response time. For example, suppose that some of the nodes have higher compute or storage capacities, then the read/write response times on these nodes are faster and if write weights are assigned to the nodes so that the quorum has a higher response time, the entire read/write response time may be improved. (3) Selecting an election time out and heartbeat interval. In a stretched network where nodes are not in close proximity to each other, if the heartbeat interval or election time out is selected to be very small, then the leader election can happen even when the leader has not failed because the nodes might not receive the heartbeat in time (e.g., due to variance in network latency) and therefore assume the leader has failed. Selecting a large heartbeat/election timeout also degrades performance, because the nodes detect the failure very late. The election timeout and heartbeat interval also change the performance of the leader election (the amount of time the system is without leader). For example, during the election process, if the election timeout and heartbeat interval are large, then it takes more time to choose a leader, and if it is too small, multiple nodes might start the election and a split vote might happen which results in repeating the election. Both of these scenarios increase the time the network is without a leader. Therefore, selection of these heartbeat and timeout have an impact on the performance of leader election in a stretched network.

Figure 4:
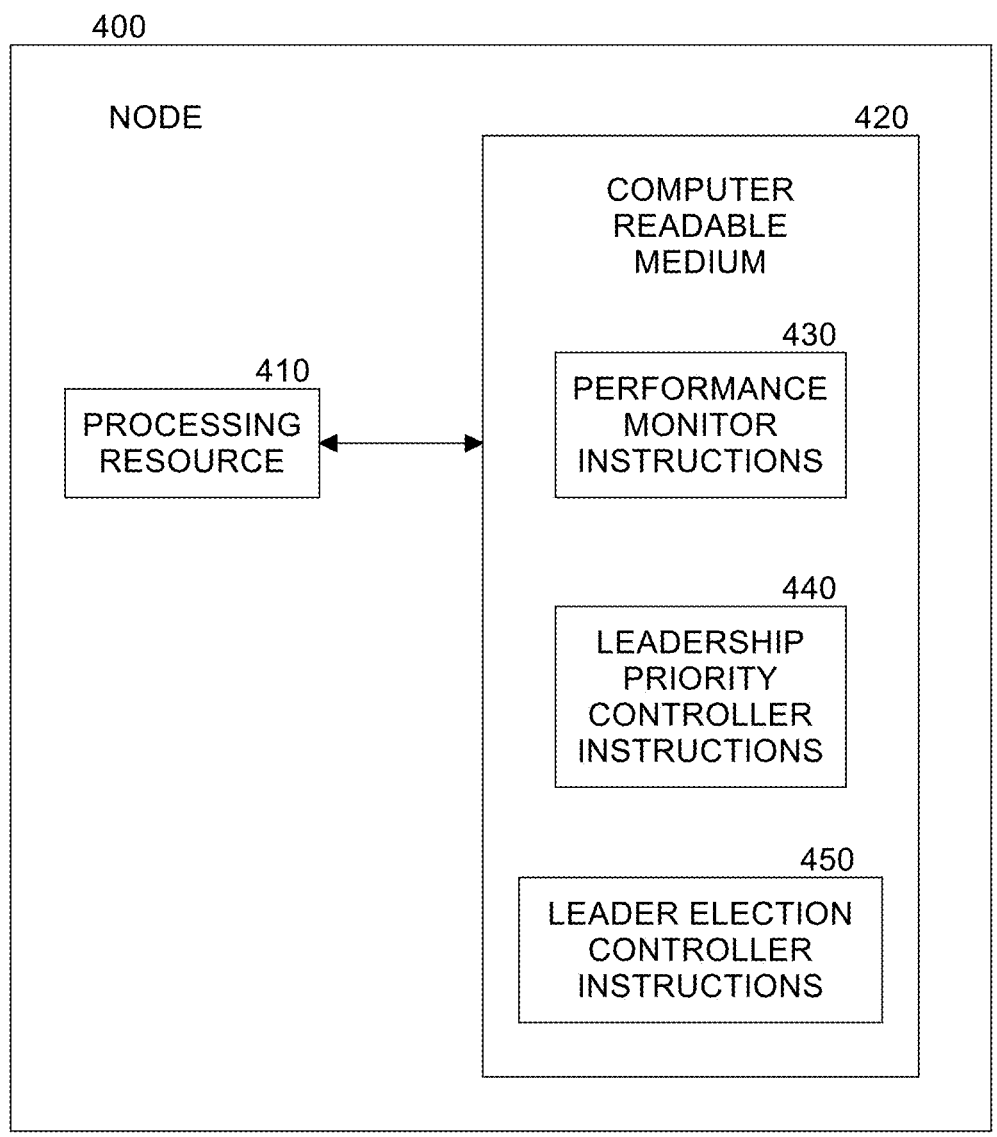
FIG. 4 is a block diagram of a node of a distributed system in accordance with an embodiment.

FIG. 4 is a block diagram of a node 400 of a distributed system in accordance with an example embodiment. In the simplified example illustrated by FIG. 4, node 400 includes a processing resource 410 coupled to a non-transitory, machine readable medium 420 encoded with instructions to maintain service availability for a distributed system. The processing resource 410 may include a microcontroller, a microprocessor, central processing unit core(s), an ASIC, an FPGA, and/or other hardware device suitable for retrieval and/or execution of instructions from the machine readable medium 420 to perform the functions related to various examples described herein. Additionally, or alternatively, the processing resource 410 may include electronic circuitry for performing the functionality of the instructions described herein.

The machine readable medium 420 may be any medium suitable for storing executable instructions. Non-limiting examples of machine readable medium 420 include RAM, ROM, EEPROM, flash memory, a hard disk drive, an optical disc, or the like. The machine readable medium 420 may be disposed within node 400, as shown in FIG. 4, in which case the executable instructions may be deemed "installed" or "embedded" on node 400. Alternatively, the machine readable medium 420 may be a portable (e.g., external) storage medium, and may be part of an "installation package." The instructions stored on the machine readable medium 420 may be useful for implementing at least part of the methods described herein.

As described further herein below, the machine readable medium 420 may have stored thereon a set of executable instructions 430, 440, and 450. It should be understood that part or all of the executable instructions and/or electronic circuits included within one box may, in alternate implementations, be included in a different box shown in the figures or in a different box not shown. In some implementations, the machine readable medium 420 may include other instructions not shown to perform other functions described herein, such as establishing a write weight or an election timeout.

Instructions 430, upon execution, cause the processing resource 410 to perform performance monitoring of node 400 and network 100. In one embodiment, instructions 430 may correspond generally to instructions for performing block 302 of FIG. 3.

Instructions 440, upon execution, cause the processing resource 410 to perform leadership priority controller processing. Execution of instructions 440 may correspond generally to instructions for performing blocks 304, 306, and 308 of FIG. 3.

Instructions 450, upon execution, cause the processing resource 410 to perform leadership election controller processing. Execution of instructions 450 may correspond generally to instructions for performing block 310 of FIG. 3.

Figure 5:
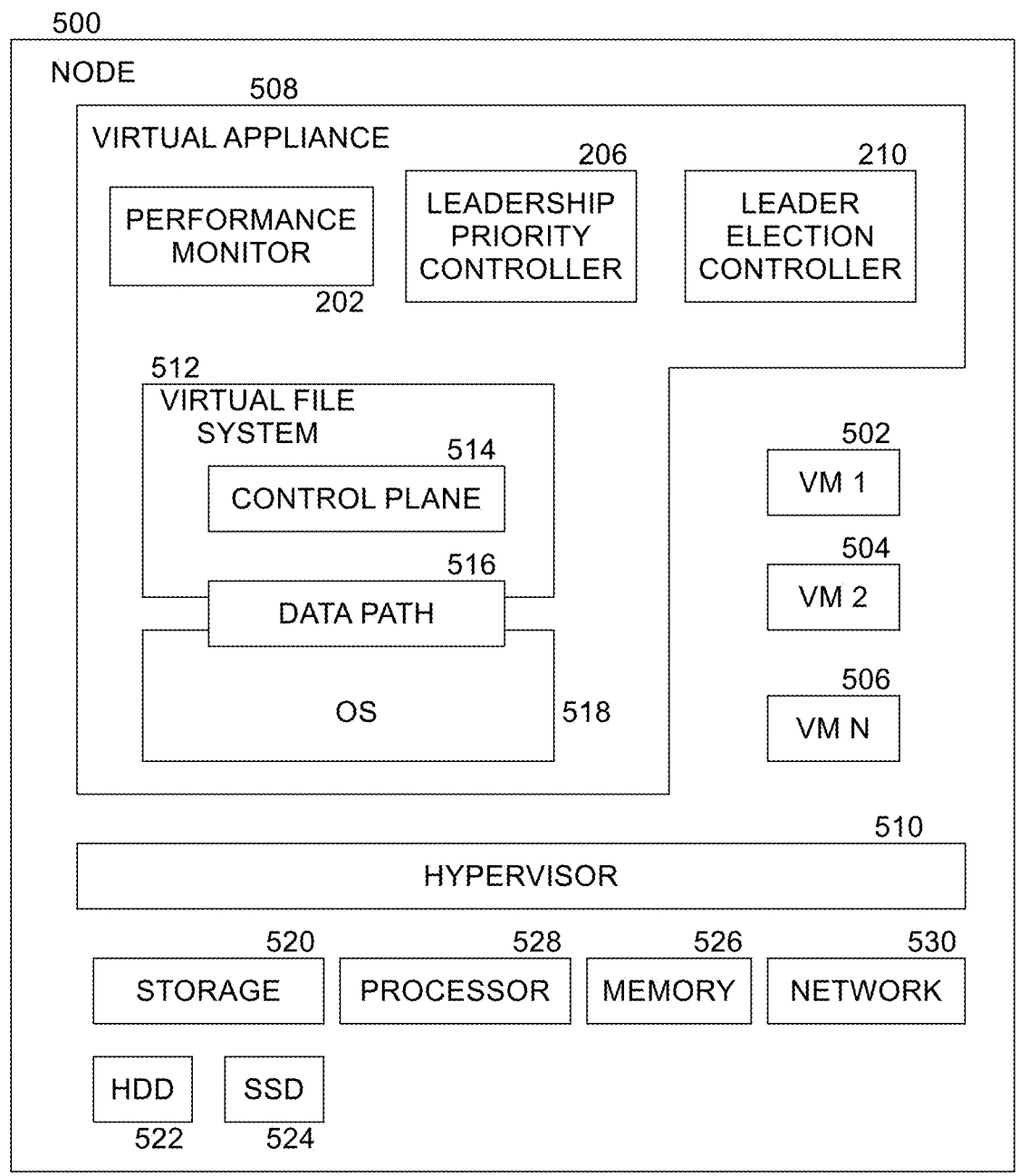
FIG. 5 is a block diagram illustrating a node that may represent the nodes of a distributed system in accordance with an embodiment.

FIG. 5 is a block diagram illustrating a node 500 that may represent the nodes of a distributed system in accordance with an embodiment. In the context of the present example, node 500 has a software-centric architecture that integrates compute, storage, networking and virtualization resources and other technologies.

Node 500 may be implemented as a physical server (e.g., a server having an x86 or x64 architecture) or other suitable computing device. In the present example, node 500 hosts a number n of guest virtual machines (VM) 502, 504 and 506 (n being a natural number) and can be configured to produce local and remote backups and snapshots of the virtual machines. In some embodiments, multiple of such nodes, each performing reduced performance monitor 202, leadership priority controller 206, and leader election controller 210 processing (such as that described above in connection with FIGS. 2 and 3), may be coupled to a network and configured as part of a cluster. Depending upon the particular implementation, one or more services supported by the distributed system may be related to VMs 502, 504 and 506 or may be unrelated.

Node 500 can include a virtual appliance 508 above a hypervisor 510. Virtual appliance 508 can include a virtual file system 512 in communication with a control plane 514 and a data path 516. Control plane 514 can handle data flow between applications and resources within node 500. Data path 516 can provide a suitable Input/Output (I/O) interface between virtual file system 512 and an operating system (OS) 518, and can also enable features such as data compression, deduplication, and optimization. According to one embodiment the virtual appliance 508 represents a virtual controller configured to run storage stack software (not shown) that may be used to perform functions such as managing access by VMs 502, 504 and 506 to storage 520, providing dynamic resource sharing, moving VM data between storage resources 522 and 524, providing data movement, and/or performing other hyperconverged data center functions.

Node 500 can also include a number of hardware components below hypervisor 510. For example, node 500 can include storage 520 which can be Redundant Array of Independent Disks (RAID) storage having a number of hard disk drives (HDDs) 522 and/or solid-state drives (SSDs) 524. Node 500 can also include memory 526 (e.g., random-access memory (RAM), read-only memory (ROM), flash, etc.) and one or more processors 528. Lastly, node 500 can include wireless and/or wired network interface components to enable communication over a network 530 (e.g., with other nodes or with the Internet).

In the foregoing description, numerous details are set forth to provide an understanding of the subject matter disclosed herein. However, implementation may be practiced without some or all these details. Other implementations may include modifications and variations from the details discussed above. It is intended that the following claims cover such modifications and variations.

What is claimed is:

1. A method comprising:
continuously monitoring network performance and/or network latency among a cluster of a plurality of nodes coupled in communication via a network in a distributed computer system;
setting a leadership priority for each node based at least in part on the monitored network performance and/or network latency, each node having a vote weight based at least in part on the leadership priority of the node, a vote of each node being biased by the vote weight of the node; and
selecting one of the plurality of nodes to become a leader node during an election, the selected leader node receiving a number of votes higher than a maximum possible number of votes biased by respective vote weights received by any other node in the cluster.

2. The method of claim 1, wherein a vote weight of 0 for a node prevents the node from becoming the leader node.

3. The method of claim 1, comprising setting the vote weight for a node based on a geographical location of the node.

4. The method of claim 1, comprising setting the vote weight for a node based on network latency of the node from other nodes.

5. The method of claim 1, comprising setting the vote weight for a node based on an amount of computing resources of the node.

6. The method of claim 1, comprising changing the vote weight of a node during run-time of the cluster based at least in part on the monitored network performance and/or network latency.

7. The method of claim 1, comprising electing a new leader node for the cluster based at least in part on changes in leadership priorities represented by the vote weights.

8. The method of claim 1, comprising periodically sending a heartbeat signal by the leader node to other nodes and calling an election when a node does not receive a heartbeat signal for a predetermined amount of time.

9. The method of claim 1, wherein the plurality of nodes comprise a high-availability (HA) stretch cluster.

10. The method of claim 1, comprising setting a write weight for each node, the write weight to be used by the leader node to determine confirmation of a weighted quorum of nodes before committing a write by a node during the election.

11. The method of claim 1, comprising setting the leadership priority of a node based at least in part on network end-to-end latency, the node being assigned to one of a majority cluster and a minority cluster based at least in part on round trip time (RTT) between the node and other nodes in the cluster.

12. The method of claim 1, comprising setting the leadership priority of a node based at least in part on geographic location of the node, the node being assigned to one of a majority cluster and a minority cluster based at least in part on K means clustering to categorize nodes into the majority cluster or the minority cluster based on geographic location.

13. The method of claim 1, comprising setting the leadership priority of a node based at least in part on a normalized round trip time (RTT) between the node and other nodes in the cluster.

14. A non-transitory machine-readable medium storing instructions executable by a processing resource of a distributed system comprising a plurality of nodes coupled in communication via a network, the non-transitory machine-readable medium comprising instructions when executed to:
continuously monitor network performance and/or network latency among a cluster of a plurality of nodes coupled in communication via a network in a distributed computer system;
set a leadership priority for each node based at least in part on the monitored network performance and/or network latency, each node having a vote weight based at least in part on the leadership priority of the node, a vote of each node being biased by the vote weight of the node; and
select one of the plurality of nodes to become a leader node during an election, the selected leader node receiving a number of votes higher than a maximum possible number of votes biased by respective vote weights received by any other node in the cluster.

15. The non-transitory machine-readable medium of claim 14, comprising instructions to:
set a write weight for each node, the write weight to be used by the leader node to determine confirmation of a weighted quorum of nodes before committing a write by a node during the election.

16. The non-transitory machine-readable medium of claim 14, comprising instructions to:
set the leadership priority of a node based at least in part on network end-to-end latency, the node being assigned to one of a majority cluster and a minority cluster based at least in part on round trip time (RTT) between the node and other nodes in the cluster.

17. A system comprising:
a performance monitor to continuously monitor network performance and/or network latency among a cluster of a plurality of nodes coupled in communication via a network in a distributed computer system;
a leadership priority controller to set a leadership priority for each node based at least in part on the monitored network performance or network latency, each node having a vote weight based at least in part on the leadership priority of the node, a vote of each node being biased by the node's vote weight; and
a leader election controller to select one of the plurality of nodes to become a leader node during an election, the selected leader node receiving a number of votes higher than a maximum possible number of votes biased by respective vote weights received by any other node in the cluster.

18. The system of claim 17, the leadership priority controller to set the vote weight for a node based on a geographical location of the node.

19. The system of claim 17, the leadership priority controller to set the vote weight for a node based on network latency of the node from other nodes.

20. The system of claim 17, the leadership priority controller to set the vote weight for a node based on an amount of computing resources of the node.

\* \* \* \* \*